Patented June 19, 1928.

1,674,077

UNITED STATES PATENT OFFICE.

WILHELM WILD AND CHRISTOPH BECK, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PRODUCTION OF ALKALI METAL NITRATES.

No Drawing. Application filed September 24, 1927, Serial No. 221,850, and in Germany September 6, 1926.

It is known that alkali metal chlorids can be converted into alkali metal nitrates by means of nitric acid which may also be employed in the form of nitrogen oxids the conversion being effected in such concentration that the resulting nitrate separates out in the solid state, either directly or on cooling. The said process may also be carried out continuously by again employing the acid solution remaining after the resulting hydrochloric acid has been distilled off, in the process, either directly or after being mixed with fresh nitric acid or treated with nitrous gases. This process, however, can be carried on in a continuous manner only when pure alkali metal chlorids are used.

We have now found that the said process may also be carried out continuously with alkali metal chlorids which are contaminated with soluble sulphates, such as is the case with 20 per cent, 30 per cent and 40 per cent potash salts, provided the sulphate ions are eliminated from the acid saline solutions by the addition of oxids, carbonates or nitrates of such metals as for example, those of the alkaline earth metals which form sulphates which are only slightly soluble in water. The sulphate ions, contrary to expectation, may be precipitated without difficulty, for example as gypsum, from the strongly acid solutions which here come into question, though gypsum is known to be soluble in hydrochloric acid and in nitric acid. Also, contrary to expectation, the precipitation of the sulphate ions is unattended with considerable loss of potash, notwithstanding the known fact, that when potassium sulphate is converted, for example with calcium nitrate, in neutral solution, a double salt, high in potash, is precipitated at first. According to the present process, on the contrary, a precipitate free from potash is obtained by the addition of the said compounds.

If the sulphates, contained as impurities in the potash salts employed, consist wholly or in part of sulphates other than those of the alkali metals, as for example magnesium sulphate or iron sulphate, the augmentation of these metal ions ($Mg^{..}$, $Fe^{..}$) in the solutions may be prevented by suitably adjusting the proportions of the acid solution and the added oxid, for example, an alkaline-earth metal oxid.

If, for example 40 per cent potash salt be treated by the process for the production of potassium-sodium nitrate, an amount of calcium nitrate, oxid or carbonate equivalent to the sulphate content of the potash salt under treatment is added after each conversion, or after several conversions. The deposited calcium sulphate may be removed prior to, or at the same time as the alkali metal nitrates deposited from the solution, the nitrates being purified, if necessary, by any known or suitable methods such as crystallization, flotation, and the like. Similarly, the acid solution may, preferably after several conversions, be wholly or partially neutralized with calcium oxid or carbonate, any magnesium and iron present being precipitated by a further addition of calcium oxid. Any increase of calcium ions resulting therefrom in the solutions may easily be prevented by an addition of a corresponding amount of sulfuric acid or alkali sulphate.

The following example will further illustrate how our invention may be carried out in practice, but the invention is not limited to this example.

Example.

To 1 cubic meter of a solution containing 425 kilograms of nitric acid, 150 kilograms of potassium chlorid, 30 kilograms of sodium chlorid and 20 kilograms of calcium sulfate, are added at 35° C., 60 kilograms of a 40% potash salt. On cooling the resulting solution to 15° to 18° C., a mixture of about 60 kilograms of potassium nitrate and 10 kilograms of sodium nitrate is deposited and separated from the mother liquor. The mother liquor is then treated with a mixture of nitrogen oxids, oxygen and nitrogen such as is obtained by oxidizing ammonia with air and separating the resulting water. In this treatment hydrochloric acid gas is disengaged from the solution which has then about the same composition as that initially employed. All of the aforesaid operations are then repeated twice. Thereby the solution takes up about 20 kilograms of sulfuric acid originating from the sulfate contents of the potash salt. Before or after the next treatment with nitrogen oxids an amount of calcium equivalent to the said amount of sulfuric acid is added in the form of carbonate, nitrate or oxid and thereby all of the sulfuric acid taken up from the potash salt is precipitated in the form of gypsum (about 35 kilograms $CaSO_4.2H_2O$). The addition of the calcium may also be effected by adding the amount thereof equivalent to all of the sulfuric acid taken up in the form of calcium oxid or of a mixture of calcium oxid and calcium carbonate only to such an amount of the liquid (about 60 liters) which is neutralised thereby, so that the metals, iron and aluminium, accumulating in the solution are precipitated together with a gypsum, whereupon this precipitate is filtered off and the filtered solution is added to the remainder of the original liquid, the bulk of the sulfuric acid being thereby precipitated as gypsum.

What we claim is:

1. The process of producing alkali metal nitrates from alkali metal chlorids which are contaminated with soluble sulfates which consists in treating the said chlorids in aqueous solution with nitric acid, and acting on the resulting solutions with a compound selected from the class consisting of the oxids, carbonates and nitrates of metals which form sulfates difficultly soluble in water.

2. The process of producing alkali metal nitrates from alkali metal chlorids, which are contaminated with soluble sulfates of the alkali metals and other metals, which consists in treating the said chlorids in aqueous solution with nitric acid, acting on the resulting solution with a compound selected from the class consisting of the oxids, carbonates and nitrates of those metals which form sulfates difficultly soluble in water, precipitating the metals other than the alkali metals with calcium oxid, removing any calcium ions still present by an addition of a corresponding amount of sulfuric acid and repeating the said series of operations, after adding fresh crude alkali metal salt to the solution.

3. The process for the production of potassium-sodium nitrate from crude potassium chlorid containing substantial amounts of soluble sulfates which consists in treating the said chlorid in aqueous solution with nitric acid and acting on the resulting solution with a compound selected from the class consisting of the oxids, carbonates and nitrates of a metal which forms a sulfate difficultly soluble in water.

In testimony whereof we have hereunto set our hands.

WILHELM WILD.
CHRISTOPH BECK.